Sept. 21, 1971    W. H. SCHWARTZ    3,606,640
INJECTION MOLDING APPARATUS
Filed Jan. 23, 1969
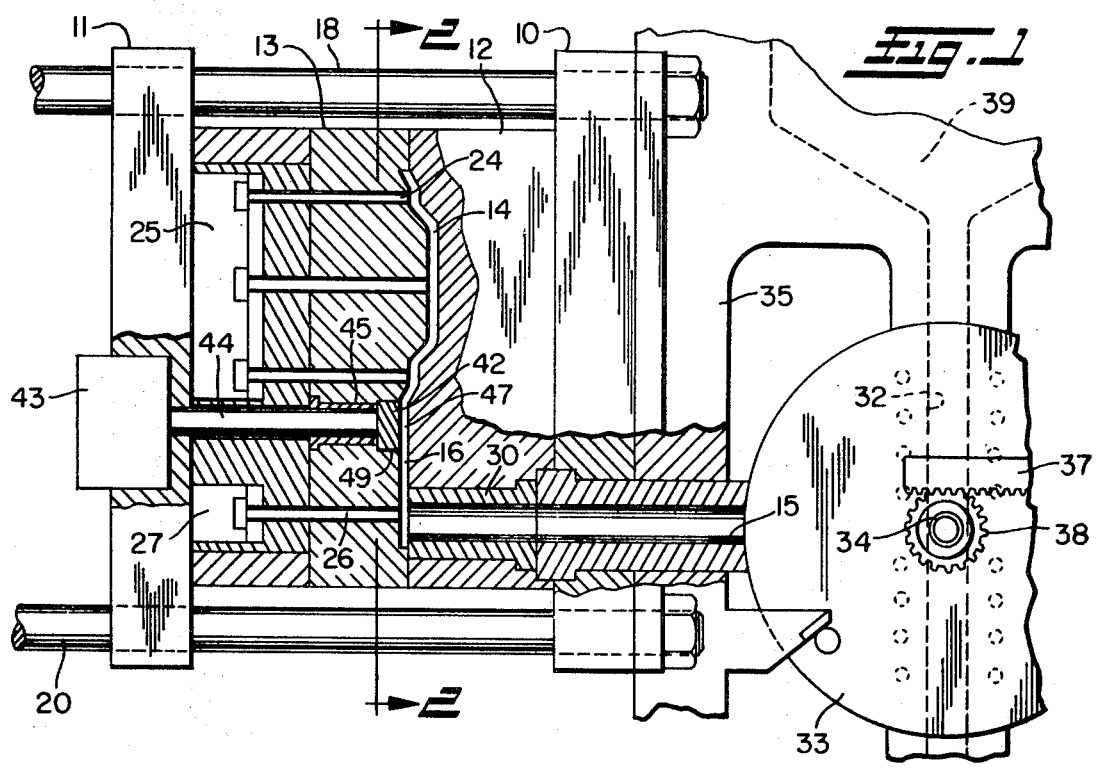
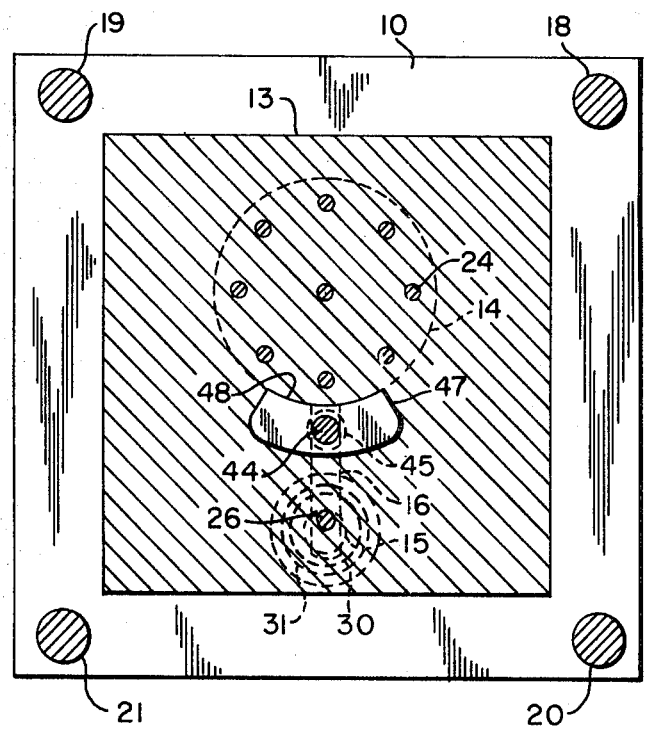
INVENTOR
WILLIAM H. SCHWARTZ
BY
Oberlin, Maky, Donnelly & Renner
ATTORNEYS United States Patent Office 3,606,640
Patented Sept. 21, 1971

3,606,640
INJECTION MOLDING APPARATUS
William H. Schwartz, University Heights, Ohio, assignor to Lester Engineering Company, Cleveland, Ohio
Filed June 23, 1969, Ser. No. 793,406
Int. Cl. B29f 1/05
U.S. Cl. 18—30RV                     5 Claims

ABSTRACT OF THE DISCLOSURE

An injection molding machine having relatively movable die platens adapted to support separable molds which include a gate runner leading from the shot cylinder to the die cavity, a cut-off plate actuated by a hydraulic piston-cylinder assembly to move into the gate runner cutting off the gate to the cavity, such plate being of the same configuration as the gate runner.

---

This invention relates generally as indicated to an injection molding apparatus and method and more particularly to such apparatus and method for the molding of hard to mold materials such as fiber reinforced polyester.

The strength of such hard to mold materials makes it difficult to remove the molded article from the separated mold halves. The molded part in the die cavity will usually adhere to the cover die half because of the plastic material remaining in the runner.

If the runner is removed with the molded article, it must then be removed or trimmed from the part and this results in a more costly part.

It is accordingly a principal object of the present invention to provide an injection molding machine capable of molding economically and efficiently such hard to mold plastic materials as fiber glass reinforced polyesters.

Another object is the provision of such machine and a method utilizing a cut-off plate actuated by a hydraulic piston-cylinder assembly which moves into the gate runner cutting off the gate to the cavity after the cavity has been filled.

A further object is the provision of such a machine and method utilizing a cut-off plate which has the same configuration as the gate runner.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawing:

FIG. 1 is a fragmentary side elevation partially broken away and in section of a machine in accordance with the present invention; and FIG. 2 is a vertical section taken substantially on the line 2—2 of FIG. 1.

Referring now more particularly to FIG. 1, it will be seen that the machine includes a fixed die platen 10 and a movable die platen 11 which support respectively cover die half 12 and ejector die half 13.

The two die halves form a circular die cavity 14 which is connected to cylindrical passage 15 through runner 16. The movable die platen 11 is moved by a clamping mechanism, not shown, along four tie rods 18, 19, 20 and 21. The tie rods extend from the fixed die platen 10 to an end plate supporting the clamping mechanism. Reference may be had to applicant's copending application, Ser. No. 781,552, filed Dec. 5, 1968, entitled "Injection Molding Machine," for an illustration of a suitable clamping mechanism.

The ejector die half includes a plurality of ejector pins 24 actuated by ejection piston mechanism 25 which extends to eject the finished product from the ejector die half when the two die halves have separated. An ejector pin 26 actuated by piston 27 will simultaneously extend to eject the plastic material from the runner 16.

Plastic material is injected into the die cavity through the cylindrical passage 15 formed by cylindrical members 30 and 31 mounted in the cover die half and the fixed die platen respectively by an injection plunger passing through shot cylinder 32 in shot wheel 33 supported for rotational movement about trunnions 34 in frame 35. The shot wheel is indexed 90° by the rack and pinion 37, 38 after the shot cylinder 32 has been loaded with plastic material from the chamber 39. When the shot cylinder is in horizontal position, an injection plunger passes through the shot cylinder and through the passage 15 to force the prepared shot into the cavity 14. Reference may be had to applicant's copending application entitled "Injection Molding Machine and Method," filed Jan. 24, 1969, Ser. No. 793,838, for a more clear description of the shot mechanism which may be used with the present invention.

After the plastic material has filled the cavity 14 by the extension of the shot plunger, cut-off plate 42 is moved to the right as seen in FIG. 1 by extension of hydraulic piston-cylinder assembly 43. The rod 44 of such assembly extends through sleeve 45 moving the cut-off plate 42 to the right into the runner 16.

As seen more clearly in FIG. 2, the runner includes a horizontally extending substantially C-shape portion 47 which is of the same thickness as the main lower portion of the runner 16 as well as the cavity 14. This gate portion of the runner is equal to the part wall thickness thus minimizing the working of the material as it is injected into the cavity 14. The plate 42 includes a circular top surface 48 which when extended underlies the circular cavity 14. In its retracted position, the plate fits within a recess 49 in the ejector die half.

When the plate 42 is thus extended, it fits into the upper portion of the runner closing the same and circularizes the bottom portion of the die cavity. The plate, of course, may be provided with any desired configuration corresponding with that of the required runner and the configuration of the cavity. In any event, the extension of the cut-off plate 42 blocks further communication between the runner 16 and the cavity 14.

Upon separation of the die halves 12 and 13, the ejector pins will function to remove the finished part from the ejector die half 13 as well as that portion of the material remaining within the runner 16.

Other modes of applying the principles of the invention may be employed, change being made as regards the details described, provided the features stated in any of the following claims or the equivalent of such be employed.

I, therefore, particularly point out and distinctly claim as my invention:

1. An injection molding machine comprising a movable platen supporting an ejector die half, a fixed platen supporting a cover die half, said dies when closed forming a die cavity, a runner connecting said die cavity to a shot cylinder, said runner being formed by a groove in said ejector die half and including a gate portion, and a cut-off mechanism adapted to move into said runner to cut-off the same at said gate portion after said cavity has been filled with plastic material, said cut-off mechanism including a plate of the same configuration as such gate portion.

2. An injection molding machine as set forth in claim 1 wherein said mechanism includes a hydraulic piston-cylinder assembly operative to shift said plate into cut-off position.

3. An injection molding machine as set forth in claim 1 wherein such runner includes an enlargement forming such gate portion, such enlargement being of the same wall thickness as such cavity and runner, said cut-off mechanism when actuated filling such enlargement to cut-off such runner from the cavity.

4. An injection molding machine as set forth in claim 1 wherein said ejector die half has an ejection mechanism, said mechanism including first ejection means adapted to strip molded plastic material from said cavity and second ejection means adapted to strip molded plastic material from said runner.

5. An injection molding machine as set forth in claim 1 wherein said plate has one edge which complements the shape of the cavity while closing such gate portion.

References Cited

UNITED STATES PATENTS

| | | |
|---|---|---|
| 2,456,778 | 12/1948 | Gilchrist. |
| 2,471,148 | 5/1949 | Gale et al. _____ 18—30(NI) |
| 2,770,025 | 11/1956 | Mollers. |
| 2,878,515 | 3/1959 | Strauss _____ 18—30(RV) |
| 2,966,702 | 1/1961 | Soubier _____ 18—30(AA)X |
| 3,443,001 | 5/1969 | Adair et al. ____ 18—30(RV)X |

FOREIGN PATENTS 994,417    7/1949    France.

J. SPENCER OVERHOLSER, Primary Examiner

M. O. SUTTON, Assistant Examiner

U.S. Cl. X.R.

18—30WD